US008069298B2

(12) United States Patent
Chang et al.

(10) Patent No.: US 8,069,298 B2
(45) Date of Patent: Nov. 29, 2011

(54) METHOD OF STORING AND ACCESSING HEADER DATA FROM MEMORY (75) Inventors: Robert C. Chang, Danville, CA (US); Po Yuan, Milpitas, CA (US); Bahman Qawami, San Jose, CA (US); Farshid Sabet-sharghi, Los Altos Hills, CA (US); Junzhi Wang, San Jose, CA (US); Xian Jun Liu, San Jose, CA (US); Chieh-Hao Yang, Sunnyvale, CA (US); June Li, San Jose, CA (US); Mei Yan, Cupertino, CA (US); Fabrice Jogand-Coulomb, San Carlos, CA (US)

(73) Assignee: SanDisk Technologies Inc., Plano, TX (US)

( * ) Notice: Subject to any disclaimer, the term of this patent is extended or adjusted under 35 U.S.C. 154(b) by 608 days.

(21) Appl. No.: 11/771,804

(22) Filed: Jun. 29, 2007

(65) Prior Publication Data
US 2009/0006724 A1 Jan. 1, 2009

(51) Int. Cl.
*G06F 12/00* (2006.01)
*G06F 13/00* (2006.01)

(52) U.S. Cl. ........ 711/103; 711/100; 711/112; 711/113; 711/147; 711/154

(58) Field of Classification Search .................. 711/164, 711/100, 103, 112, 113, 117, 118, 147, 154
See application file for complete search history.

(56) References Cited

U.S. PATENT DOCUMENTS

| 5,841,979 | A | 11/1998 | Schulhof et al. |
| 5,917,912 | A | 6/1999 | Ginter et al. |
| 5,933,498 | A | 8/1999 | Schneck et al. |
| 6,614,914 | B1 | 9/2003 | Rhoads et al. |
| 6,834,195 | B2 | 12/2004 | Brandenberg et al. |
| 7,123,696 | B2 | 10/2006 | Lowe |
| 7,171,018 | B2 | 1/2007 | Rhoads et al. |
| 2002/0002468 | A1 | 1/2002 | Spagna et al. |
| 2002/0077988 | A1* | 6/2002 | Sasaki et al. ............... 705/59 |
| 2002/0186842 | A1 | 12/2002 | Sabet-Sharghi et al. |
| 2003/0126517 | A1 | 7/2003 | Givoni et al. |
| 2003/0167395 | A1 | 9/2003 | Chang et al. |
| 2003/0182579 | A1 | 9/2003 | Leporini et al. |
| 2004/0107356 | A1 | 6/2004 | Shamoon et al. |
| 2005/0050108 | A1 | 3/2005 | Sawant et al. |
| 2005/0080743 | A1 | 4/2005 | Ostrover et al. |
| 2006/0010500 | A1 | 1/2006 | Elazar et al. |
| 2006/0062426 | A1* | 3/2006 | Levy et al. ............... 382/100 |

(Continued)

OTHER PUBLICATIONS iTunes and ID3 Tag Management; Christidis. Konstantinos; Jun. 1, 2005.*

(Continued)

*Primary Examiner* — Tuan V. Thai
(74) *Attorney, Agent, or Firm* — Toler Law Group (57) ABSTRACT

Methods of storing and accessing data using a header portion of a file are disclosed. In an embodiment, a method of storing content in a non-volatile memory is disclosed. The method includes reading a content file including media content and including a trailer, storing information related to the trailer together with secure data in a header portion of a file, and storing the file to a storage element of the non-volatile memory or a memory area of a host device coupled to the non-volatile memory device.

21 Claims, 8 Drawing Sheets

U.S. PATENT DOCUMENTS

| | | |
|---|---|---|
| 2006/0095792 A1 | 5/2006 | Hurtado et al. |
| 2006/0161749 A1* | 7/2006 | Chen et al. .................... 711/164 |
| 2006/0179325 A1 | 8/2006 | Debiez |
| 2006/0182418 A1 | 8/2006 | Yamagata et al. |
| 2006/0190290 A1 | 8/2006 | Gomez |
| 2006/0206582 A1 | 9/2006 | Finn |
| 2006/0235550 A1 | 10/2006 | Csicsatka et al. |
| 2007/0011469 A1 | 1/2007 | Allison et al. |
| 2007/0011749 A1 | 1/2007 | Allison et al. |
| 2007/0033374 A1 | 2/2007 | Sinclair et al. |
| 2007/0043667 A1 | 2/2007 | Qawami et al. |
| 2007/0056042 A1 | 3/2007 | Qawami et al. |
| 2007/0180468 A1 | 8/2007 | Gill et al. |
| 2007/0180470 A1 | 8/2007 | Gill et al. |
| 2008/0140433 A1 | 6/2008 | Levy et al. |

OTHER PUBLICATIONS

International Search Report and Written Opinion of the International Searching Authority for International Application No. PCT/US2008/008019 dated Feb. 10, 2009, 13 pages.

Nilsson, M., "ID3 tag: ID3v2.4.0: Main Structure and Native Frames", XP-002302388, Nov. 1, 2000, 38 pages, http://www.id3.org/develop.html.

* cited by examiner

METHOD OF STORING AND ACCESSING HEADER DATA FROM MEMORY

CROSS REFERENCE TO RELATED APPLICATIONS

This application is related to an application being filed concurrently herewith by Chang et al., entitled "Media Content Processing System and Non-Volatile Memory that Utilizes a Header Portion of a File", Ser. No. 11/771,775, which application is incorporated herein by reference in its entirety.

BACKGROUND

The present disclosure is generally related to non-volatile memory systems that include access to a header portion and a content portion of a file. Memory systems, such as memory cards that include non-volatile memory devices, have many purposes and can be used to store media content, such as audio or video files. In such systems, information related to the media content, such as a title of a song or a movie, may be stored in a last sector of the memory. A host device of the memory system, such as a mobile phone or a host computer, may need to retrieve the last sector of a file for multiple data files, and a file system at the host device may be required to traverse a memory cluster to find the last sector data associated with one or more of the multiple data files. This task may consume a considerable amount of valuable processing resources and take a large amount of time, reducing performance of the device. For example, a processor may be requested to traverse through a file access table (FAT) that has thousands of files during an initialization process, leading to a prolonged initialization period, which creates the perception of degraded performance. In addition, with media files, customers may wish to find music information for display. Conventional systems can take a long time to read the designated sector and check the frame before the media file starts to play. This problem can be more severe with certain processors and for memory that contains a large number of encrypted files. Hence, there is a need for improved control of stored media content.

SUMMARY

Methods of storing and accessing data using a header portion of a file are disclosed. In an embodiment, a method of storing content in a non-volatile memory is disclosed. The method includes reading a content file including media content and including a trailer, storing information related to the trailer together with secure data in a header portion of a file, and storing the file to a storage element of the non-volatile memory or a memory area of a host device coupled to the non-volatile memory device. The information may include a trailer location.

In another embodiment, a method of retrieving content is disclosed. The method includes reading content from a non-volatile memory, reading trailer data information associated with the content from a header portion of a secure file, and providing data related to the trailer data to a display device of a host device having access to the non-volatile memory. The header portion further includes secure data items related to the content.

In another embodiment, a method of accessing media content using a non-volatile rewritable memory is disclosed. The method includes receiving information regarding access rights, storing the access rights in a secure memory area of the non-volatile rewritable memory, supplying a decrypted version of at least one selected encrypted media content item, and supplying metadata retrieved from a header portion of the secure memory area. The metadata is associated with the at least one selected encrypted media content item. The decrypted version of the at least one selected encrypted media content item is to be provided to a host device. The access rights permit access to content decryption keys for decrypting encrypted media content stored in the non-volatile rewritable memory.

DETAILED DESCRIPTION OF THE DRAWINGS

Figure 1:
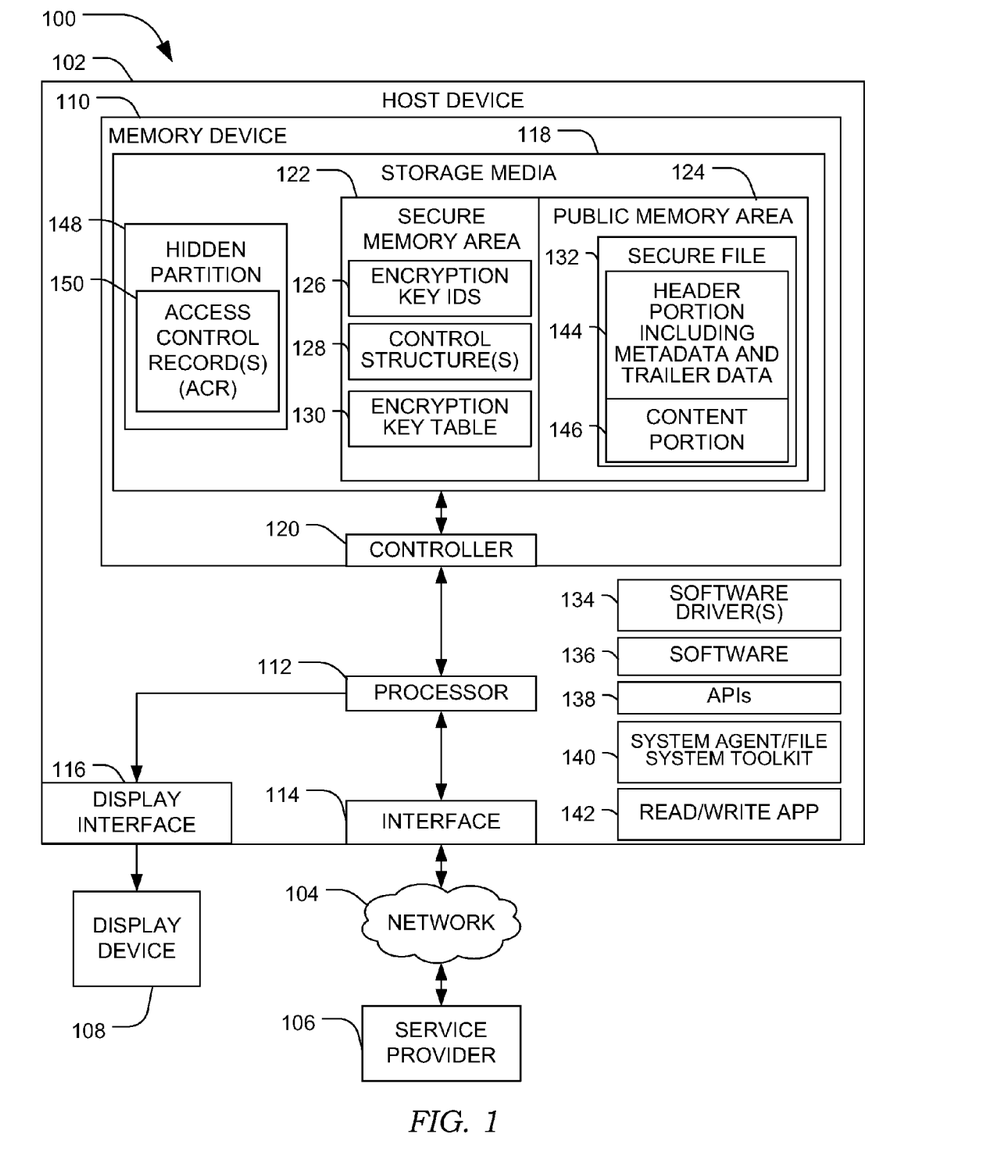
FIG. 1 is a block diagram of an illustrative embodiment of a system that includes a host device and a memory device.

FIG. 1 is a block diagram of an illustrative embodiment of a system 100 that includes a host device 102 and a memory device 110 that is accessible to the host device 102. While the memory device 110 is illustrated within the host device 102, the memory device 110 may be an external memory device that is accessible to the host device 102 via one or more interfaces, such as a universal serial bus (USB) interface, a small computer system interface (SCSI), an Advanced Technology Attachment (ATA), an Integrated Drive Electronics (IDE) interface, a Serial ATA interface, a FireWire interface, other interfaces, or any combination thereof. In a particular illustrative embodiment, the memory device 110 can be a flash memory card, a smart card, a hard disk, another memory type, or any combination thereof.

The host device 102 may communicate with a service provider 106 via a network 104. The service provider 106 can be a media content source. The host device may also communicate display data to a display device 108, which may be coupled to the host device 102 or integrated with the host device 102.

The host device 102 includes the memory device 110, a processor 112 that has access to the memory device 110, a display interface 116, and a network interface 114 that is responsive to the network 104. The display interface 116 may receive data from the processor 112 and communicate the data to the display device 108 for display. The memory device 110 includes a storage media 118 and a controller 120 that controls access to data stored at the storage media 118. The storage media 118 includes a secure memory area 122 and a public memory area 124. The secure memory area 122 includes encryption key identifiers (IDs) 126, one or more control structures 128, and optionally an encryption key table 130.

The public memory area 124 may also include a secure file 132 that includes a header portion 144 having metadata and trailer data and that includes a content portion 146. The header portion 144 includes security data, trailer data, and metadata related to content to be stored in the public memory area 124. The security data can include directory information related to a hidden area within the secure memory area 122 of the storage media 118. The trailer data may include a location associated with a predetermined portion of the file content. For example, the trailer data may include a location associated with a limited portion of the content, such as the last 512 bytes of a file, a selected sector of data from the file, a predefined segment of the file, or any combination thereof. In a particular illustrative embodiment, the trailer data includes a first field to indicate whether the trailer data is aligned to a sector boundary, a second field to identify a number of sectors of the trailer data, a third field to identify a sector offset value of the trailer data, and a fourth field to identify a byte offset value associated with a sector of a memory area, such as the secure memory area 122 and the public memory area 124, of the memory device 110. The header portion 144 includes at least one secure data item and includes metadata related to media content to be stored in a non-volatile memory, such as the memory device 118. The header portion 144 can include a variable number of fields that include data related to the content file. At least one of the fields contains a signature area.

The host device 102 includes software drivers 134 that can be executed by the processor 112 to communicate with various components of the host device 102, such as the display interface 116, network interface adapters (such as the network interface adapter 114), modems, other internal and peripheral hardware, or any combination thereof. Additionally, the host device 102 includes software applications 136 and application program interfaces (APIs) 138 that can be executed by the processor 112 to provide functionality to the host device 102. The APIs 138 may include one or more instructions executable by the processor to store a last sector location (e.g., trailer data) of a file to be stored in the memory device 110 into a header portion of the file. The APIs 138 may also include at least one instruction to read a last sector of the file.

The host device 102 also includes a system agent/file system toolkit 140. The system agent/file system toolkit 140 includes a system agent software application that may be executed by the processor 112 or by the controller 120 to configure various aspects of the storage media 118. The system agent/file system toolkit 140 may be used to access content stored on the storage media 118 based on a set of credentials associated with the system agent/file system toolkit 140. In a particular embodiment, the system agent/file system toolkit 140 may have a built-in set of credentials that can be authenticated by the controller 120 using an access control record 150 stored in a hidden partition 148 of the storage media 118.

Additionally, the host device 102 includes read/write applications executable by the processor 112 and/or the controller 120 to access the secure memory area 122 and the public memory area 124. The memory device 110 may also include a hidden partition 148. The hidden partition 148 may not be visible to a file system of the host device 102, but may be accessible to the controller 120 of the memory device 110. The hidden partition 148 may include one or more Access Control Records (ACRs) 150. Each record may include a table of authentication credentials and associated permissions. The controller 120 may utilize the ACR 150 within the hidden partition 148 to control access to content stored in the public memory area 124 and to the secure memory area 122, by authenticating each access request and each host application. In a particular illustrative embodiment, the host device 102 may establish a secure session with the controller 120, and the controller 120 may decrypt content from the secure memory area 122 and encrypt the content using a session key before providing the content to the host device 102. In this manner, the content is protected and the encryption key can be used by the controller 120 without exposing the encryption key outside of the memory device 110.

In general, to access the hidden partition 148, a login to an access control record (ACR) 150 is provided. After login, the controller 120 can retrieve content. In a particular illustrative embodiment, access permissions may be retrieved based on a login to provide unlimited playback of the retrieved content. In another particular illustrative embodiment, the login may be calculated from a content identifier and secret values (such as shared secret values between the host device 102 and the memory device 110). The host device 102 with the system agent/file system toolkit 140 can access the content because the toolkit application has the correct credentials built-in.

In a particular illustrative embodiment, the memory device 110 includes a trusted content protection feature that may be used in conjunction with an application that is running on the host device 102. The application may include a digital rights management agent that can be part of the application. For example, the application may be a media content player application, such as an MP3 player application, which may include the digital rights management (DRM) agent. Access to content stored on the memory device 110 may be controlled by logging into an access control record 150, which may be stored within the hidden partition 148 of a storage media 118 of the memory device 110. The access control record 150 can include multiple trusted identifiers and associated credentials.

In a particular illustrative embodiment, the hidden partition 148 may include a set of access control records 150. For example, each application running on the host device 102 may have its own digital rights management agent and the hidden partition 148 may include an access control record 150 that is associated with each digital rights management (DRM) agent. In an alternative embodiment, the hidden partition may include an access rights management table. The Access Control Records (ACRs) 150 may be utilized to establish secure sessions between the memory device 110 and an application running on the host device 102. The ACRs 150 may also be used to determine access permissions to control access to stored content.

In a particular illustrative example, the content portion of the file may include audio data, such as a song, and the metadata for that file may include data indicating song-related information associated with the audio data, such as a title, a length of a particular audio track, a name of a performer, other information, or any combination thereof. In a particular illustrative embodiment, the song-related information can include identity information, such as Moving Picture Experts Group (MPEG) audio layer-3 (MP3) identity information.

The secure memory area 122 may receive and store control structures 128 and other secure data such as encryption key identifiers (IDs) 126. The encryption key IDs 126 may be accessed to locate encryption keys that may be used to encrypt or decrypt media content items.

In a particular illustrative embodiment, the memory device 110 may be provided by a manufacturer, a service provider, a reseller, or another source. The memory device 110 may include pre-loaded media content, such as audio content, video content, other media content, or any combination thereof. The controller 120 may utilize an ACR within the hidden partition 148 to authenticate a host device 102 and to determine access permissions for use with the host device 102. Once such access permissions are determined, the software APIs 138 and the read/write application 142 can be utilized by the controller 120 to control access to such pre-loaded media content. For example, the APIs 138 may include a rights management protocol that may be used by the controller 120 to lock the media content to the memory device 110. The APIs 138 may allow the media content to be played on supported devices, such as the host device 102. Further, if the memory device 110 is a removable memory device, such as a flash card, the memory device 110 may be removed and connected to a different playback device, which may be used to access and play the media content. By inserting metadata into a header portion of the content file, the media playback device can readily access the title and song information, for example, to produce a playlist for selection by a user.

In a particular illustrative embodiment, the host device 102 may provide a file and a memory address from a file access table (FAT) to the storage device 110 for secure storage. The FAT may be maintained and controlled by the host device 102. The host device 102 may also provide an encryption key identifier (ID) to the storage device 110. The controller 120 may execute one or more APIs 138 and the read/write application 142 to extract metadata and location information related to trailer data from the content of the file and insert the extracted metadata and the location information into a header portion of the file. Alternatively, the trailer data may be extracted from the content of the file and inserted into the header portion. Additionally, the controller 120 may write security data from the header portion 144 of the secure file 132 to the secure memory area 122. The controller 120 may also access the encryption key table 130 to retrieve an encryption key associated with the encryption key ID. Alternatively, the controller 120 may generate an encryption key, store the encryption key in the encryption key table 130, store the encryption key ID in the encryption key IDs 126, and store an association between the encryption key ID and the encryption key table 130. The controller 120 may utilize the encryption key to encrypt a file. The encrypted file may then be stored as a secure file 132 in the public memory area 124.

In general, the system agent/file system toolkit 140 may be used in connection with many different memory devices. The APIs 138 allow a user to access data including the header portion 144 of the secure file 132. The disclosed system and method extends usage of the header to store information to enhance performance, to provide information related to content, or for other purposes. For example, metadata and location information related to trailer data may be stored in the header portion 144 to provide ready access to limited data from the file content of the secure file 132, without having to decrypt the entire secure file. The limited data may include information such as a media content title, author, length, file type, preview data, other information, or any combination thereof.

In a particular illustrative embodiment, the memory device 110 may include an API 138 that is executable by the controller 120 to request a file system to store the last sector location of a file into the header. Another API 138 may be executed by the controller 120 to read the last sector of a portion of the storage media 118 For preloaded files, the system agent/file system toolkit 140 may include a utility to build a metadata file related to the file content by extracting, for example, ID3 information for MP3 songs. The system agent/file system toolkit 140 can be utilized to build a pre-loaded memory card by writing metadata into the header portion of the file that includes pre-loaded media content (e.g., audio content, video content, other content, or any combination thereof). An example of such a pre-loaded memory card is a GRUVI Card that is commercially available from SanDisk Corporation of Milpitas, Calif.

In general, the APIs 138 may be executed by the controller 120 to perform a variety of API functions. Examples of APIs that may be used include an API to store the metadata, an API to retrieve the metadata, an APT to store the location information related to trailer data or the trailer data, and an API to retrieve the trailer data. The API to store the metadata has an input of a file name and the data structure of the metadata to be stored. The host device 102 passes the file name and the metadata structure to the system agent/file system toolkit 140, which has been loaded by the controller 120. The system agent/file system toolkit 140 writes the metadata to a header portion of the file to be stored. In a particular embodiment, the metadata structure and the metadata information include one or more of the following: a content name, an artist name, an album name, a genre, a duration, a copyright, a description of content, a frame number, a time, a bit rate, a sample rate, and a stereo indicator.

The APIs 138 also include a "retrieve metadata" API that has a file name and the metadata structure as its inputs. The retrieve metadata API provides a status to indicate success or an error as its output. The retrieve metadata API is used to retrieve and fill the metadata structure. The retrieve metadata API is used by the host device 102 that passes the file name and an empty metadata structure to the system agent/file system toolkit 140. The system agent/file system toolkit 140 fills the metadata structure from the header portion 144 of the stored secure file 132.

The APIs 138 may also include a "store trailer data" API that receives a file name as its input. The store trailer data API provides a status output indicating that the store operation was successful or that the store operation encountered an error. The store trailer data API may provide a success code or an error code as its output. The store trailer data API is used by the host device 102, which passes the file name to the system agent/file system toolkit 140. The system agent/file system toolkit 140 retrieves the stored file information from a directory entry and determines a last sector location of the file. The store trailer data API then fills the trailer box and writes the trailer data to the header.

The APIs 138 may also include a "retrieve trailer data" API that receives a file name, a buffer size, and a buffer as its inputs. The retrieve trailer data API provides a status indicator at its output. The retrieve trailer data API, upon success, fills the buffer and provides the length of the data in the buffer. During use of the retrieve trailer data API, the host device 102 passes the file name to the system agent/file system toolkit 140. The system agent/file system toolkit 140 reads the trailer data of the header portion 144 and retrieves the file information from the directory entry. The retrieve trailer data API then checks whether the secure file 132 has been modified or moved. If the file information matches the header, then the retrieve trailer data API uses the information to read the trailer data. The retrieve trailer data API then fills the buffer up to the buffer size and returns the filled buffer to the host device. If there is more data than will fit in the buffer due to a size limit, the retrieve trailer data API returns a status to indicate that the buffer is too small for all of the trailer data. A user, the host device 102, or the controller 120 may utilize the system agent/file system toolkit 140 and the above-described APIs 138 to store content into a secure memory area 122 or to retrieve previously stored content. In addition, an application running at the host device may use the APIs 138 to retrieve requested content for playback.

The content file may include audio content, video content, text data, multimedia content, other data content, or any combination thereof. The processor 112 of the host device 102 may execute software 136 and read/write applications 142 to read and playback content from the content file. In a particular illustrative embodiment, the memory device 110 is adapted to manage encryption keys without providing the encryption keys to external components. The memory device 110 may be adapted to utilize the encryption key identifiers provided by the host device 102 or received from other devices to locate a key associated with selected media content and to manage the encryption/decryption within the memory device 110.

In a particular illustrative embodiment, the host device 102 may communicate with a server at the service provider 106 via the network 104. In a particular embodiment, the network 104 may be a local area network. In another particular embodiment, the network 104 may be a wide area network, such as the Internet. The server at the service provider 106 may provide media content to the host device 102 and may communicate with the controller 120 and/or the system agent/file system toolkit 140 to generate control structures 128 within the secure memory area 122 of the storage media 118. The controller 120 may utilize the control structures 128 to manage and control access to particular media content stored at the storage media 118.

In an illustrative example, the content portion 146 of the secure file 132 includes video data. The header portion 144 has the location information related to trailer data that includes information related to the video data that is stored in a predetermined location of the secure file 132. For example, the trailer data may include data from an end of file, from a last sector or last data block of the file, from a predetermined portion of the file, from multiple portions of the file, or any combination thereof. The header portion 144 may include the location information related the end of the file, the last sector or last data block of the file, and so on. The video data may be provided to the host device 102 for playback and display via the display device 108, which may include audio reproduction capabilities. The processor 112 can provide data related to the trailer data to the display device 108, while authentication is being performed at the memory device 110, while the secure file 132 is being decrypted at the memory device 110, or any combination thereof.

In a particular illustrative embodiment, the host device 102 may include a system agent/file system toolkit, such as the system agent/file system toolkit 140, for providing read and write access with respect to encrypted computer readable files. The processor 112 of the host device 102 can utilize the system agent/file system toolkit 140 to store location information related to the trailer data from a last sector of a content file into a header portion of the content file. The modified content file may then be encrypted and stored in the public memory area 124 as a secure file 132. At a later time, the processor 112 of the host device 102 can read the header portion 144 of the secure file 132 to obtain the data related to the content 146. The processor 112 may provide data related to the header portion 144 to the display device 108, such as metadata, via the display interface 116. The processor 112 may also provide an encryption key ID to the controller 120, which can utilize the encryption key IDs 126 of the secure memory area 122 to identify a decryption key and to decrypt the content portion 146 of the secure file and provide decrypted content to the processor 112. In general, the processor 112 can provide information related to the data from the header portion 144 to the display device 108 before or during playback of the content from the public (second) memory area 124.

In general, non-volatile rewritable memory devices, such as the memory device 110, are particularly suitable for storing media content. For example, flash memory cards have large storage capacities that can be used to store media content, including movies, video games, audio data, or any combination thereof. Furthermore, since flash memory cards are rewritable, such memory devices are more flexible compared to high capacity non-rewritable memories such as compact discs. Once media content in non-volatile rewritable memory devices can be securely protected and controlled by or on behalf of the content owner, such as a copyright owner, a content provider, the service provider 106, another entity, or any combination thereof, has new avenues for distributing media content. The end user will then be able to access the media content in such memory devices through different host devices without having to subscribe to multiple media services. Service providers, such as the service provider 106, can also derive additional revenue by being able to charge for the service of securely storing media content and distributing media content in a controlled manner.

For example, a non-volatile rewritable memory device, such as the memory device 110, may be pre-loaded with data, including encrypted media content and data related to the encrypted media content. In a particular illustrative embodiment, the data related to the encrypted media content may include preview data, such as unencrypted portions of the encrypted media content or unencrypted lower quality versions of such media content. The preview data may also include instructions to limit a number of plays or renderings of the full-length media content.

In a particular illustrative embodiment, the service provider 106 may provide media content to the host device 102, including preview data having playback restrictions. The content provider 106 may include one or more servers that can provide a user interface accessible by the host device 102 via the network 104 to purchase unrestricted access rights to the encrypted media content. After the end user purchases the right to access the encrypted media titles, the service provider 106 may provide a key, a control structure, or other data to the host device 102 for use by the controller 120 to provide access to the media content. In this illustrative embodiment, information associated with the host device 102 can include credentials, certificates, other types of authentication information, or any combination thereof. The information associated with the host device 102 can also include information concerning access rights, access rules, playback rules, media content sharing restrictions, and/or media content copying restrictions to control access to the encrypted media content that is available for preview. Encrypted media content associated with the preview data becomes available to the end user only after the purchase. In a particular embodiment, the service provider 106 can transmit an unabridged version of the encrypted media content to the host device 102 after the purchase. In another particular embodiment, the service provider 106 can transmit a decryption key to the host device 102 to allow the host device 102 to decrypt the preloaded encrypted media content after the purchase.

In an alternative embodiment, encrypted media content may be pre-loaded into the above described non-volatile rewritable memory device 106. Additionally, access information, including access rights, access rules, playback rules, other control information, or any combination thereof may be pre-loaded into the memory device 110. The controller 120 may utilize such access information to control access to the media content. The access information may specify that only selected portions of the encrypted media content, lower quality versions of such media content, text data related to the media content, other data, or any combination thereof may be accessible without restriction. Alternatively, the access information may specify that particular media content may be played for only a limited number of times. The host device 102 may be utilized by an end user to communicate purchase information to the service provider 106. The host device 102 may receive updated access information, which may be provided to the memory device 106 to permit access to the secure file 132. Such access may be without further restriction or with more relaxed restrictions, such as an increased number of times that the media content may be viewed.

In another particular illustrative example, service providers may utilize non-volatile rewritable memory devices, such as the memory device 110, with security features, such as the control structure 128, to control the distribution of media content, including the secure file 132. Thus, as another avenue for media distribution, the memory device 110 may be provided with security features that enable the service provider 106 to create its own secure environment on the memory device 110. The service provider 106 can create control structure 128 that can be executed by the controller 120 to control how the media content stored in the memory device 110 is to be used. The control structure 128 can take the form of a hierarchical tree, which can be configured by the service provider 106 to determine how the media content can be used and accessed at the memory device 110. The control structure 128 can also take the form of an object referred to as a rights object. The rights object can include access rights and/or access rules that are associated with specific media content and with certain authentication requirement(s). In a particular illustrative embodiment, access to the particular media content is granted when such authentication requirement(s) is satisfied and is controlled according to the access rights and/or rules. With use of the control structure 128, a number of applications may be able to access the same content without sharing keys or credentials. Further, the control structure 128 may allow the controller to delegate access rights to certain keys used to decrypt and/or encrypt content.

Figure 2:
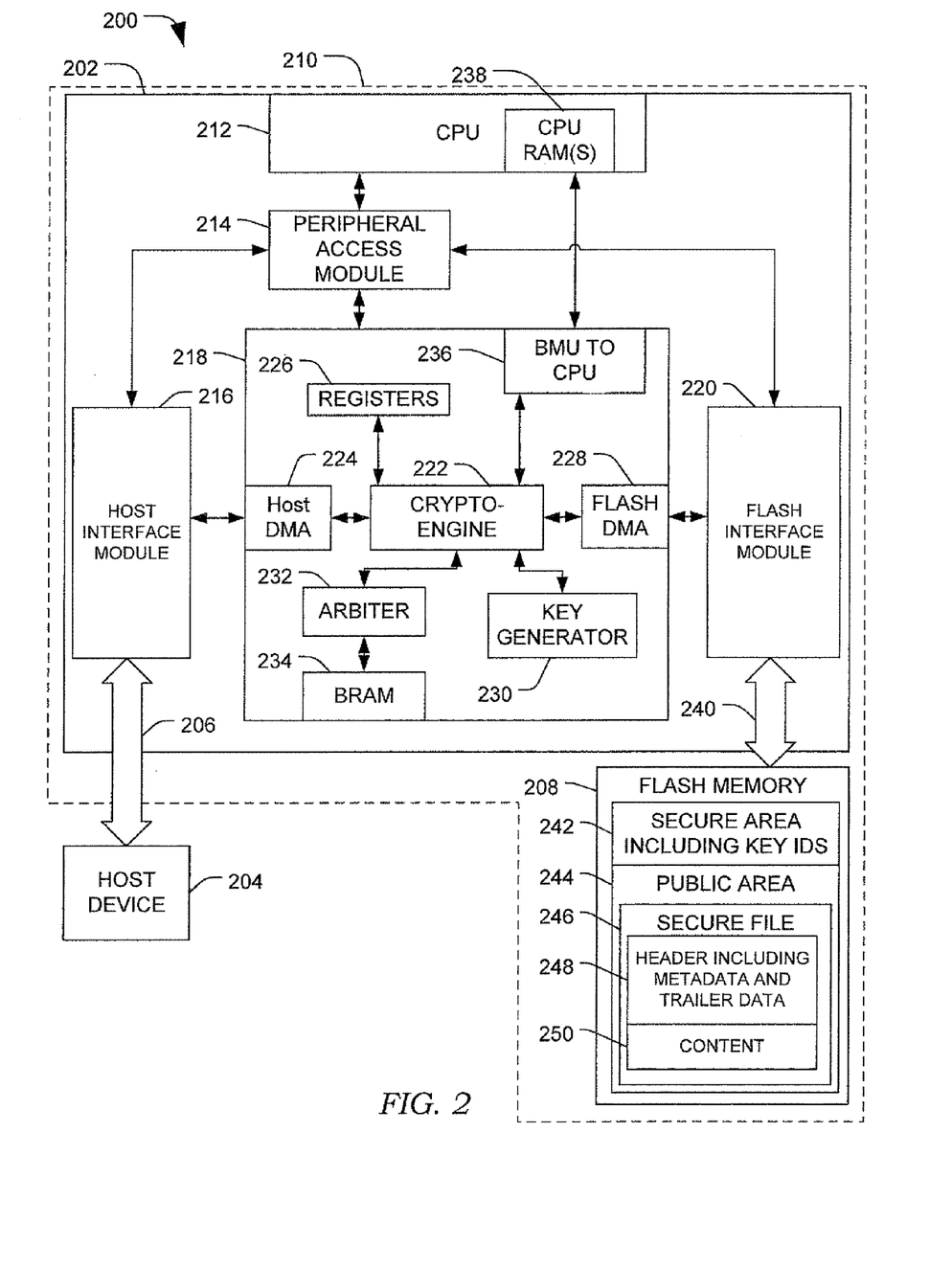
FIG. 2 is a block diagram that illustrates a particular embodiment of a controller for use with a host device coupled and a memory device.

FIG. 2 is a second particular illustrative embodiment of a system 200 to manage secure access to encrypted files stored in a memory. The system 200 includes a memory system or device 202, which may communicate with a host device 204 via a host interface bus 206 and which may communicate with a flash memory 208 via a flash interface bus 240. In a particular illustrative embodiment, all of the components of the memory device 202 and the flash memory 208 within the dotted line box (generally indicated by reference number 210) may be enclosed in a single housing or unit, such as in a memory card, a memory chip, a thumb drive, another memory device, or any combination thereof. In an alternative embodiment, the flash memory 208 may be removably coupled to the memory device 202. The memory device 202 includes a central processing unit (CPU) 212. The memory device 202 also includes peripheral access module (PAM) 214, a host interface module (HIM) 216, a buffer management unit (BMU) 218, and a flash interface module (FIM) 220. The PAM 214 couples the HIM 216, the BMU 218, and the FIM 220 to the CPU 212.

The memory device 202 communicates with the host device 204 via the HIM 216 and via the host interface bus 206. The HIM 216 is suitable for communication with the host device 204, which may be a digital camera, a personal computer, a personal digital assistants (PDA), a digital media players, a portable media device (such as an Motion Picture Experts Group Layer 3 (MP3) media player), a mobile communications device (such as a mobile telephone), other electronic devices, or any combination thereof.

The flash memory 208, which may be a NAND-type flash memory, can be used to provide data storage for the host device 204. The flash memory 208 may be accessible to the CPU 212, and software code that is executable by the CPU 212 may be stored in flash memory 208. The CPU 212 may include one or more CPU random access memories (CPU RAMs) 238. The flash memory 208 may be accessible to the host device 204 via the HIM 216, the PAM 214 and the FIM 218. The FIM 218 communicates with the flash memory 208 via a flash interface bus 240.

The BMU 218 includes a host direct memory access (DNA) 224 that communicates with the HIM 216. The host DMA 224 allows the BMU 214 to read and/or write data from and to the HIM 216, independent of the CPU 212. The DMA 224 allows the BMU 218 to transfer data to and from the host device 204 via the HIM 216 without incurring associated overhead at the CPU 212. The BMU 218 also includes registers 226, a flash direct memory access (DMA) 228, an arbiter 232, a buffer random access memory (BRAM) 234, and a cryptographic (crypto) engine 222 (crypto-engine 222). The arbiter 232 can be a shared bus arbiter so that only one master or initiator (which can be the host DMA 224, the flash DMA 228 or the CPU 212) is allowed to be active at any time to communicate with the slave or target, which is the BRAM 234. The arbiter 232 channels the appropriate initiator request to the BRAM 234. The host DMA 224 and the flash DMA 228 are responsible for data transported between the HIM 216, the FIM 220, the BRAM 234, the CPU random access memory (CPU RAM) 238, or any combination thereof.

The BMU 218 may also include a BMU to CPU interface 236 that communicates information directly to the CPU RAM 238 of the CPU 212. The BMU 218 also includes a cryptographic key generator 230 that can be used by the crypto-engine 222 to create cryptographic keys and to encrypt file data using the cryptographic keys in order to generate a secure file.

The flash memory 208 may include a secure memory area 242 that includes encryption key identifiers (IDs). The flash memory 208 may also include a public memory area 244 that includes a secure file 246 that has a header 248 and content 250. The header 248 can include metadata and location information related to trailer data associated with the content 250. Access to the secure file 246 and to the secure area 242 can be managed by the memory device 202.

The BRAM 234 is used to store data passed between the host device 204 and flash memory 208. For improved security of the content stored in the flash memory 208, the memory device 202 generates key value(s) that are used for encryption and/or decryption. However, encryption and decryption is typically performed on a file-by-file basis, since the host device 204 reads and writes data to memory device 202 in the form of files. Like many other types of storage devices, the memory device 202 is not necessarily aware of files or file systems. While the flash memory 208 does store a file allocation table (FAT) where the logical addresses of the files are identified, the FAT is typically accessed and managed by the host device 204 and not by the CPU 212. Therefore, in order to encrypt data in a particular file, the CPU 212 may rely on the host device 204 to send the logical addresses of the data associated with the file at the memory 208, so that the data of the particular file can be found and encrypted and/or decrypted by the memory device 202 using the key value(s) available only to the memory device 202.

To provide a handle for both the host device 204 and the memory device 202 to refer to the same key(s) for cryptographically processing such data, the host device 204 provides a reference for each of the key values generated by memory device 202, where such reference may be an encryption key ID. The memory device 202 may access the secure area 242 of the flash memory 208 to determine an associated encryption key based on the key ID.

In general, the host device 204 associates each file that is cryptographically processed by memory device 202 with an encryption key ID and a memory address. The memory device 202 associates each key value that is used to cryptographically process data with the encryption key ID provided by the host device 204. When the host device 204 requests that a file be cryptographically processed, the host device 204 sends a request to the memory device 202 that includes an encryption key ID and logical addresses of data to be fetched from or to be stored at the memory device 208. The memory device 202 generates a key value and associates the encryption key ID provided by the host 204 with a generated key value. The memory device 202 cryptographically processes the data fetched from or to be stored at the memory device 208. Thus, the memory device 202 can control the generation and management of the cryptographic key(s) and can control the associated cryptographic processing while allowing the host device 204 to control the file address table (FAT).

While the memory device 202 is shown to include a flash memory 208 in the form of memory card(s), the systems and methods disclosed herein may also be applicable to other types of storage media, including magnetic storage media, optical storage media, or other types of rewritable non-volatile storage media. Additionally, the systems and methods disclosed herein may also be applicable to a variety of devices that access such storage media, including computing devices, portable media players, portable communication devices, personal digital assistants (PDAs), game systems, other electronic devices, or any combination thereof.

The encryption key ID provided by the host device 204 and the key value generated by the memory device 202 may form two attributes of a quantity referred to as the "content encryption key" or CEK. In a particular illustrative embodiment, the host device 204 may associate each encryption key ID with one or more files and/or one or more file addresses within a file address table associated with the flash memory 208. In an embodiment, the host device 204 may also associate each encryption key ID with unorganized data, unstructured data, structured data, semi-structured data, data organized in any manner, or any combination thereof. Thus, an encryption key ID may be associated with data that is not necessarily organized into a file structure.

In order for a user or application to gain access to protected content or a secure memory area of the memory 208, the memory device 202 may authenticate the user or application using a credential that may be pre-registered with the memory device 202 or pre-loaded within a secure area of the memory 208. The credential can include a symmetric key, a digital signature, a digital certificate, other indicia to provide authentication, or any combination thereof. In a particular illustrative embodiment, a credential may be associated with access rights granted to the particular user, a particular device, or a particular application. In a particular embodiment, a credential may be an access code, a password, a serial number, other data, or any combination thereof. In the pre-registration process, the memory device 202 stores a record of the identity and credential of the user, device or application. The memory device 202 may also store the access rights associated with such identity and credential as determined by the user or application and as provided via the host device 204. After the pre-registration has been completed, when the user or application requests to write data to the memory 208, the user or application provides data related to its identity and credential, an encryption key ID for encrypting the data, and a logical address where the encrypted data is to be stored at the memory 208. The memory device 202 generates a key value and associates this value with the encryption key ID provided by the host device 204, and stores the encryption key ID for the key value used to encrypt the data in its record or table for this user or application. The memory device 208 then encrypts the data and stores the encrypted data at the addresses designated by the host device 204. The memory device 202 also stores the encryption key ID within a header portion of the data file. The memory device 202 may also store encryption key ID data in a secure portion of the memory 208.

Figure 3:
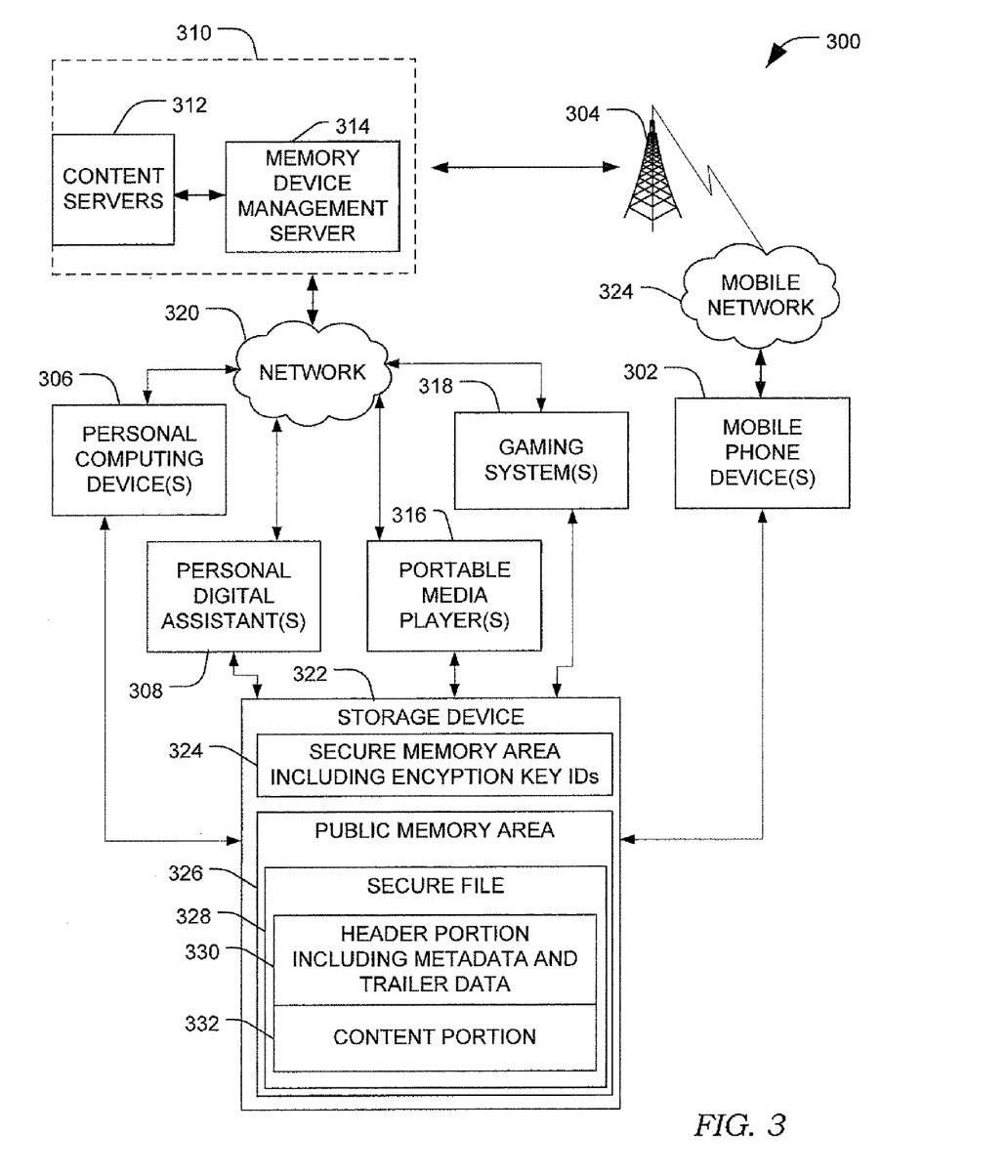
FIG. 3 is a general diagram that illustrates applications of the system of FIG. 1.

FIG. 3 illustrates an environment in which a memory device with security features, such as the memory device 210 in FIG. 2, may be used for storing media content securely and for delivering the media content stored therein in a controlled manner. As shown in FIG. 3, a system 300 includes a content provider 310, which may include one or more servers that can communicate with remote devices via networks, such as the Internet, wireless networks, public switched telephone networks, packet switched networks, other networks, or any combination thereof. The content provider 310 may include content servers 312 and a memory card management server 314. The content servers 312 can include music data, video data, multimedia content, or any combination thereof. Additionally, the content servers 312 may provide search functions, provisioning functions, and delivery functions for identifying media content, for determining access provisions and device preferences related to delivery and playback of the identified media content, and for delivering the media content via an appropriate communications path. For example, media content from the media content servers 312 may be provided to a mobile network 324 via base stations, such as the base station 304, which communicates with one or more mobile devices 302. Additionally, the content servers 312 may communicate with other devices, personal computing devices 306, personal digital assistants (PDAs) 308, portable media players 316 (such as an MP3 player), gaming systems 318, other devices, or any combination thereof, via a network 320, which may be a wide area network such as the Internet.

The content provider 310 may provide media content, which may be stored in a storage device 322, which includes a secure memory area including encryption key identifiers (IDs) 324 and includes a public memory area 326. The public memory area 326 may include a secure file 328, which includes a header portion 330 having metadata and location information related to trailer data and having a content portion 332. The delivered media content from the content provider 310 may be rendered by a variety of different end user terminals or hosts, including the PDAs 308, video game systems 318, the mobile telephones 302, the MP3 players 316, and the computers 306, which can include desktop computers, portable computers, or any combination thereof. Memory devices associated with each of the user terminals or hosts may include a secure storage area that can be configured by a service provider to provide avenues for media content distribution.

In general access to media content stored at the content servers 312 may be restricted. The card management server 314 can provide access rights and/or access rules to the user terminals or hosts. The access rights and/or access rules governing access to the encrypted media content in the card management server 314 can apply when the media content is accessed by handsets 302, by other types of terminals, such as the media player 316 and the computer 306. Content and rights and/or rules may also be provided to the computer 306 or to the mobile phone devices 302 by a service provider, such as a wireless network operator.

In the environment of FIG. 3, a number of avenues using a memory system for storing and distributing media content are available. In one method, a flash memory card manufacturer sells the memory card to a content issuer, who also buys media content from a content provider and receives the rights object(s) for controlling such content from a rights objects server. Before such content and rights object(s) are loaded to the card, the content issuer first verifies whether the card is genuine via a connection to an authentication server. The content and rights object(s) are loaded after the card has been authenticated. The authentication server may be provided at the content provider 310.

Thus, the content issuer, which may also be a card manufacturer, sells the card to a service provider, such as a mobile network operator. The service provider then sells the card together with an end user terminal, such as a cellular phone handset provided by an Original Equipment Manufacturer (referred to hereinafter as "OEM") to an end user. Before the content issuer sells the card to the service provider, the content issuer may install control structures of the type described herein. Preferably, such control structures are installed by the service provider as described to enable the service provider to create its own secure environment so that it can control content distribution. Before this happens, the card is again verified to be genuine. Thus, at the service provider's facility, the card is again authenticated by connecting to the authentication server. The card is also connected via a terminal to an authorization server to enable or activate any particular features or applications (e.g. media content rendering applications such as media players) in the card. The service provider then installs a control structure to control access to the content in the card. The control structure provides that only authorized users may be able to access the content, and such access will comply with certain permissions in the control structure or with certain rights and/or rules.

Alternatively, the content issuer may sell the card directly to the end user. The end user obtains a terminal such as a cellular phone handset from an OEM. Provided that such terminal and the card can mutually authenticate, the end user will then be able to access the content stored in the memory card using the terminal. In this configuration, the end user is provided with authentication information, such as credentials (user identifier, password, serial number, etc.) for accessing the content. The authentication process prevents others who are not provided with proper authentication to access the content in an unauthorized manner.

Alternatively, where preview content is loaded to the card by the content issuer, such content may also include encrypted unabridged versions of the media content. Thus, when the end user purchases such cards, the cards will have already stored the encrypted versions of the media content the user wishes to purchase. The cards will also have stored therein rights and/or rules that restrict the end users rights to access only the abridged versions or portions of the content in the cards. In such circumstances, there is no need to download such content to the card again. Instead, all the end user will need are the content encryption keys for decrypting the media content and an update to the rights and/or rules governing such access to permit unrestricted or more relaxed access. Such information can be downloaded from the rights issuer through the service provider after authentication.

In another embodiment, content in the card can be accessed by the end user only after the end user subscribes to a service, such as a service provided by the service provider. Thus, the card purchased by the end user will contain control information which does not allow the end user to access the content until the end user has subscribed. The end user may first purchase the card from the content issuer, but will not be able to access the media content therein until he or she has purchased a subscription from the service provider. Prior to the confirmation of the subscription, the card in the end user's possession is verified to be genuine by the authentication server and the applications (e.g. media content rendering applications such as media players) are optionally enabled or activated by the authorization server. In the subscription process, the rights object provided by the rights issuer is transmitted by the service provider to the end user for downloading to the card.

In an alternative method, the card purchased by the end user will have no pre-loaded media content. The end user will have to purchase the content from the service provider who in turn obtains content from the content provider server. As before, prior to the loading of the content to the card, the card is authenticated by the authentication server. Features and applications (e.g. media content rendering applications such as media players) are optionally enabled by the authorization server. As part of the transaction, a rights object originating from the rights issuer is transmitted through the service provider to the end user for download to the card. While the card purchased by the end user may have no pre-loaded media content, the card may have rights object(s) stored therein which entitle the end user to download such content. This is then a prepaid media content card, which enables the end user to repeatedly download content purchased.

Figure 4:
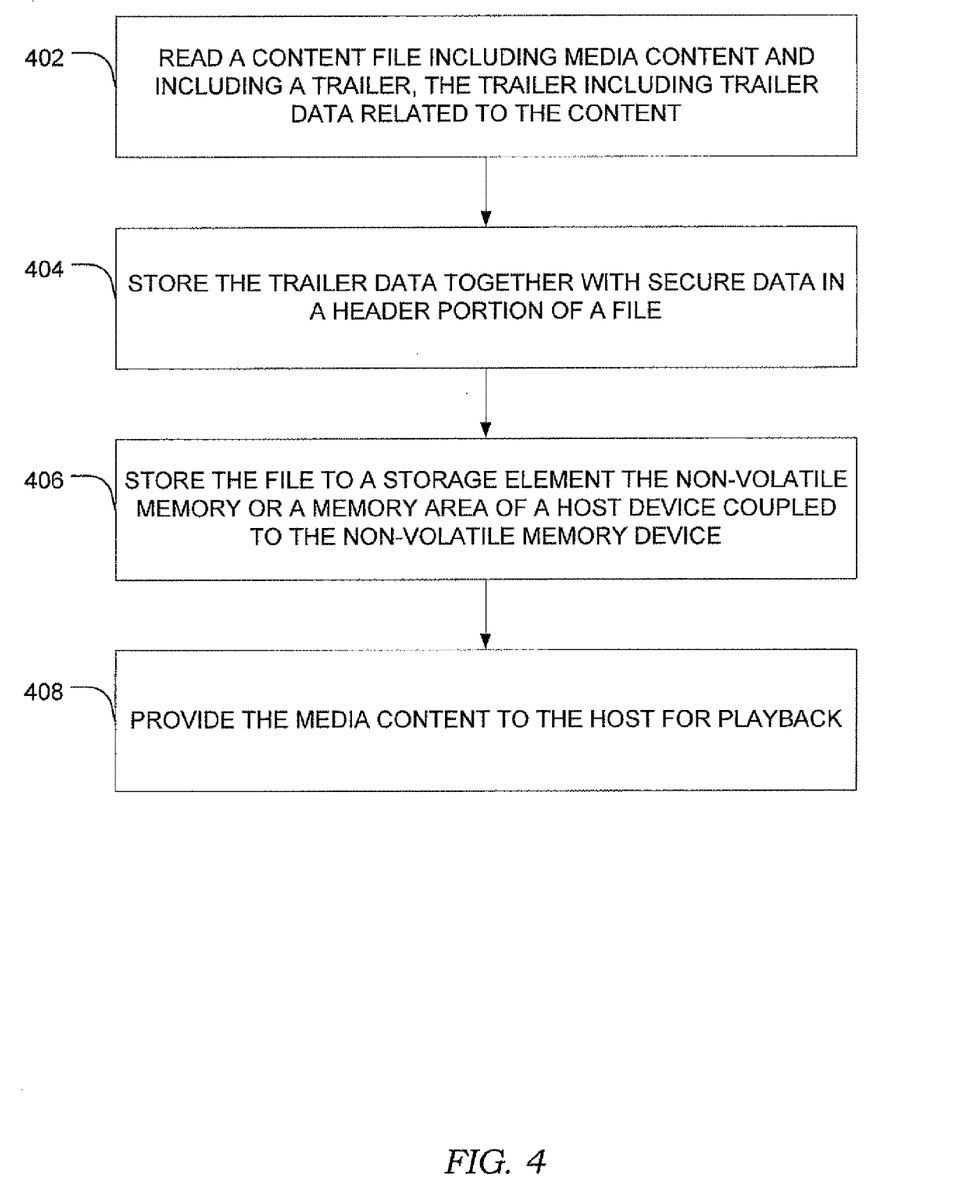
FIG. 4 is a flow chart diagram that illustrates a particular embodiment of a method of storing a content file.

Referring to FIG. 4, a particular embodiment of a method of storing content in a non-volatile memory is illustrated. The method includes reading a content file including media content and including a trailer, at 402. The trailer includes trailer data related to the media content and may include metadata, such as ID3 data. The method further includes storing location information related to the trailer data together with secure data in a header portion of a file, such as a secure file, at 404, and storing the file to a storage element of either a non-volatile memory or a memory area of a host device coupled to the non-volatile memory device, as shown at 406. The host device may be an electronic device that includes a processor and a memory, such as a phone device, a personal digital assistant (PDA), a laptop computer, or a desktop computer. In a particular embodiment, an application program interface (API) is used in connection with storing the trailer data together with the secure data in the header portion of the file. After the file is stored, the content may be retrieved from memory and the media content may be provided to the host device for playback, as shown at 408. Playback may include audio playback of audio content, video playback of video content or multimedia playback of multimedia content.

In a particular illustrative embodiment, a content provider may require the content stored at the non-volatile memory to be protected. In this instance, the protected content may be accessed using a secure session. For example, a secure session may be established between the non-volatile storage device and the host device. The non-volatile storage device may decrypt the content using a content encryption key. The decrypted content may then be encrypted using a session key associated with the secure session. The encrypted data may be provided to the host device using the secure session. The host device can then decrypt the content using the session key. By utilizing secure session procedures, the content may be secured when played back by the host device.

Figure 5:
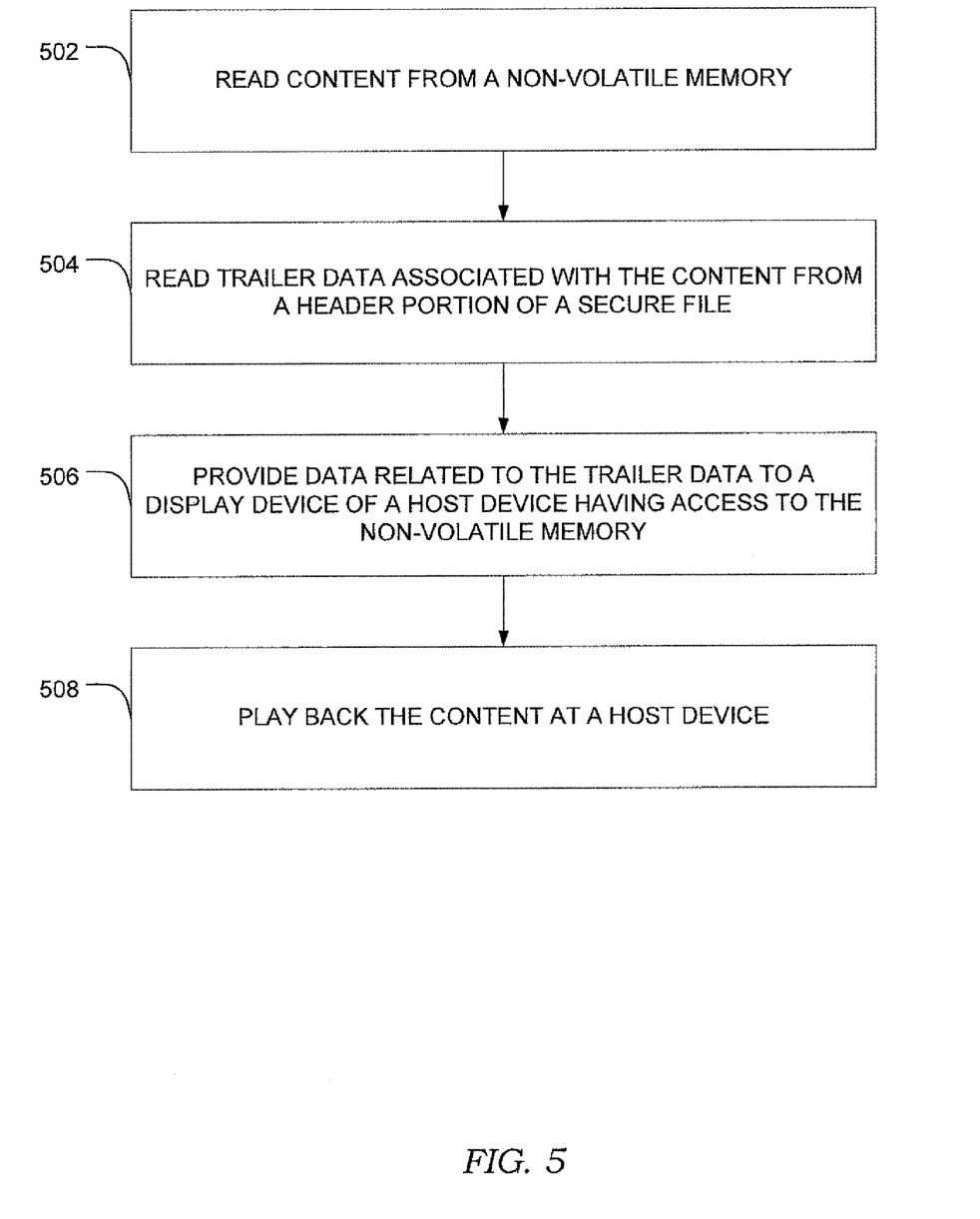
FIG. 5 is a flow chart diagram that illustrates a particular embodiment of a method of retrieving content from a memory.

Referring to FIG. 5, a particular embodiment of a method of retrieving content is illustrated. The method includes reading content from a non-volatile memory, at 502 and reading location information related to trailer data associated with the content from a header portion of a secure file, at 504. The header portion includes secure data items related to the content. The method further includes providing data related to the trailer data to a display device of a host device having access to the non-volatile memory, at 506. In a particular embodiment, the host device has access to read the content for playback, such as by using a playback program (e.g. a media player). The content may include audio data, video data, or multimedia data. In a particular embodiment, an application program interface (API) is used in connection with reading the trailer data from the header portion of the secure file. The host device may pass a file name and a metadata structure to a file system toolkit, where the file system toolkit uses the API to write the metadata to the header portion of the secure file. The content may be played back at the host device, as shown at 508. In addition, metadata retrieved from the header may be used to display information related to the content on a display device at the host device, such as display of a content title, an artist name, or other content related information on the host device. The display device may be a display on a cellular phone or an MP3 player or a display device coupled to a computer. As explained above, a secure session may be used to protect the content for playback at the host device, allowing the non-volatile memory device to provide secured content to the host device without exposing encryption keys to the host device.

Figure 6:
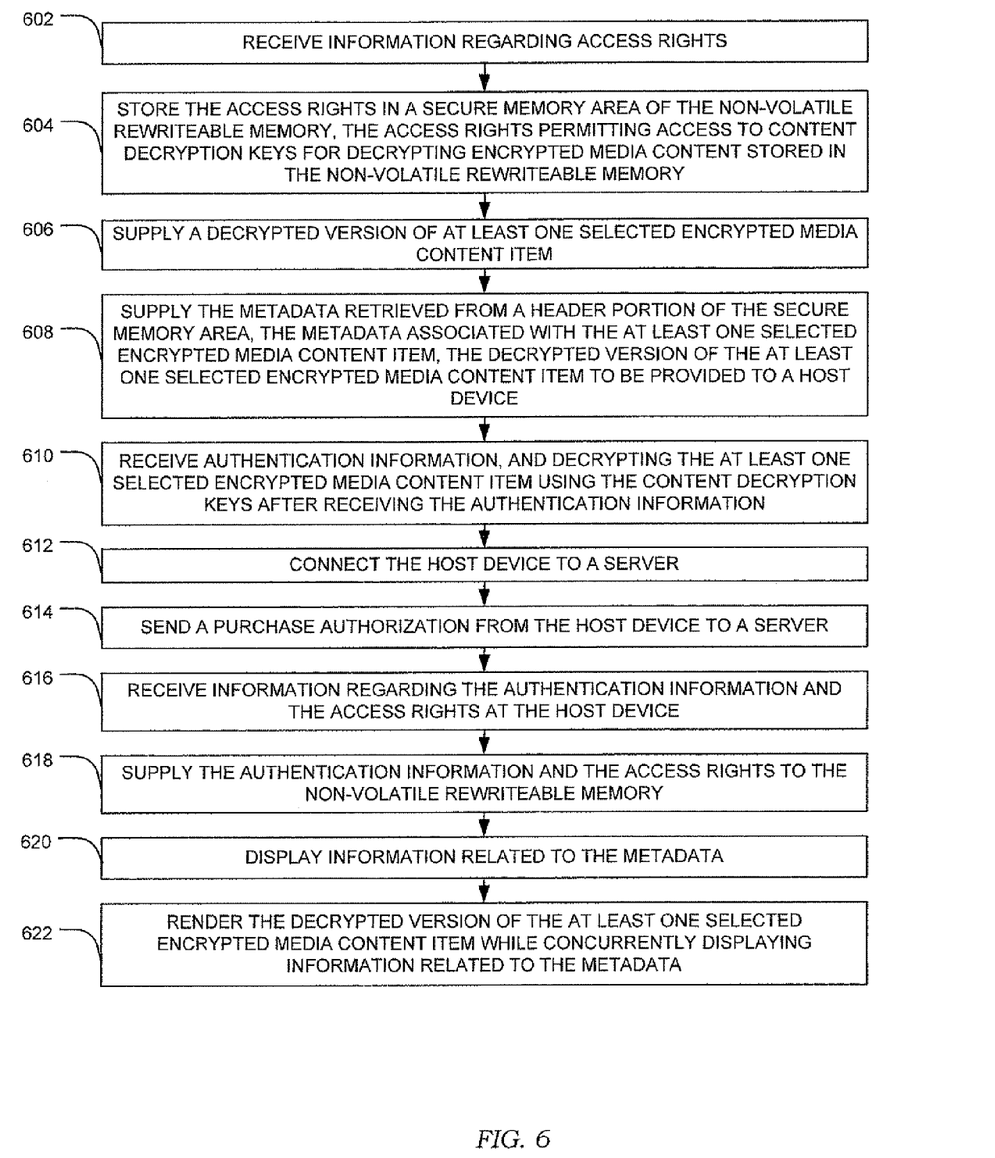
FIG. 6 is a flow chart diagram that illustrates a particular embodiment of a method of reading and rendering content of a content file.

Referring to FIG. 6, a method of accessing media content using a non-volatile rewritable memory is illustrated. The method includes receiving information regarding access rights, at 602 and storing the access rights in a secure memory area of the non-volatile rewritable memory. The access rights permit access to content decryption keys for decrypting encrypted media content stored in the non-volatile rewritable memory, at 604. The method further includes supplying a decrypted version of at least one selected encrypted media content item, at 606, and supplying metadata retrieved from a header portion of the secure memory area, at 608. The metadata is associated with the at least one selected encrypted media content item. The decrypted version of the at least one selected encrypted media content may be provided to a host device. The host device may be a phone device, a personal digital assistant (PDA), a computer, or other similar device.

The method may also include receiving authentication information and decrypting the at least one selected encrypted media content item using content decryption keys after receiving the authentication information, at 610. The host device may include a playback device for rendering the decrypted version of the at least one selected encrypted media content item. In a particular embodiment, the method further includes connecting the host device to a server, at 612, sending a purchase authorization from the host device to the server, at 614, receiving information regarding the authentication information and receiving the access rights at the host device, at 616, and supplying the authentication information and the access rights to the non-volatile rewriteable memory to permit access to selected encrypted media content items, at 618.

Information related to the metadata retrieved from the header may be displayed, as shown at 620, and the decrypted version of the at least one selected encrypted media content item may be rendered while the host device concurrently displays information related to the metadata, as shown at 622. For example, a song title or an artist name may be displayed while an audio file for the song is being played on a host device.

Figure 7:
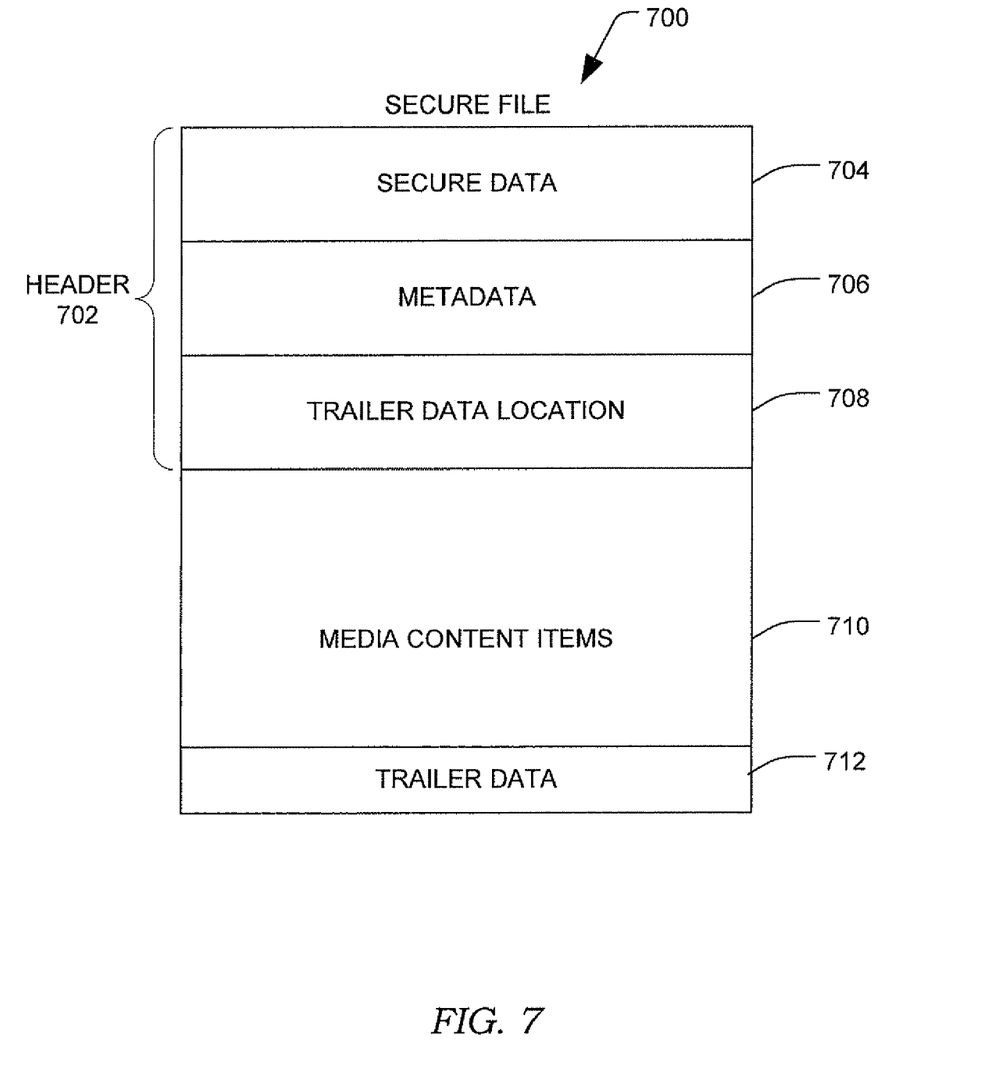
FIG. 7 is a general diagram that illustrates a data structure of a secure file that may be stored in a computer readable medium.

Referring to FIG. 7, a particular example of a data structure for a secure file 700 is illustrated. The secure file 700 may be stored on a computer readable medium, such as a computer memory device. The secure file 700 includes a header portion 702 and a content portion 710. The content portion 710 includes one or more media content items and trailer data 712. The header portion 702 includes a secure data segment 704, a metadata segment 706, and a trailer data location 708. The secure data segment 704 may include encryption key identifiers (IDs), hidden data, or other data protection information.

Figure 8:
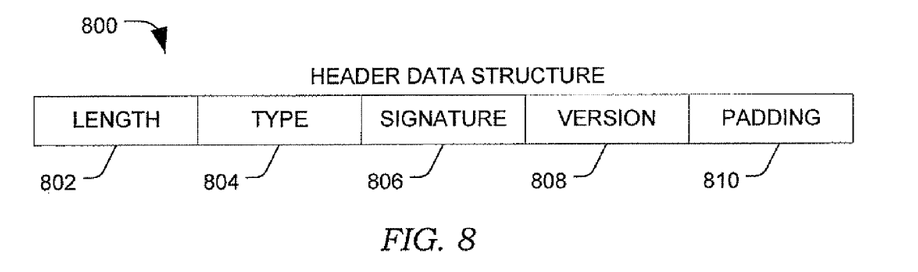
FIG. 8 is a general diagram that illustrates a data structure of a header portion of a secure file that may be stored in a computer readable medium.

Referring to FIG. 8, a representative data structure of a header portion of a file is shown. The header portion 800 includes a length field 802, a type field 804, a signature field 806, a version field 808, and padding 810. In a particular embodiment, the header data structure can include a variable number of fields (also known as boxes). Each of the fields, or boxes, includes a variable number of bytes of data with a four-byte length in the front of each box.

Figure 9:
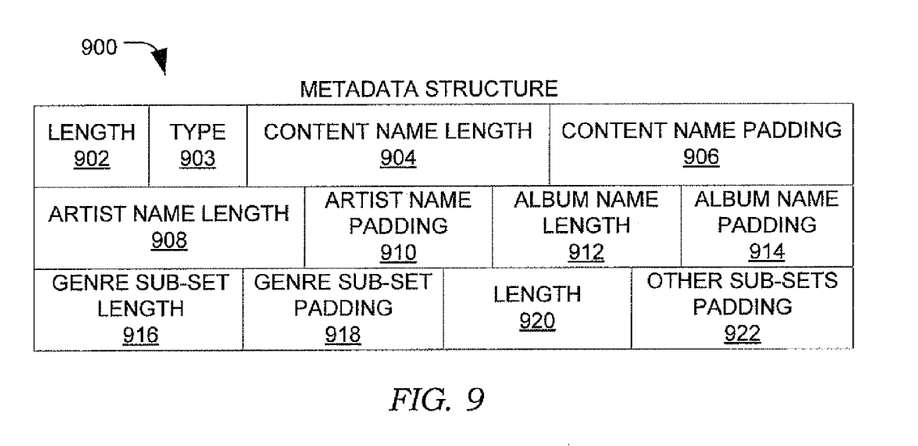
FIG. 9 is a general diagram that illustrates a data structure of metadata that may be stored within a header portion of a file.

Referring to FIG. 9, a representative data structure for metadata that may be stored within a header is shown. The metadata 900 includes a length field 902, a type field 903, a content name length field 904, a content name padding field 906, an artist name length field 908, an artist name padding field 910, an album name length field 912, an album name padding field 914, a genre subscriber length field 916, a genre subscriber padding field 918, a length of other items field 920, and other sub-boxes for other items 922. The type field 903 may, in a particular example, include the designator "mdat" to identify metadata. Also, in a particular illustrative embodiment, the length of the content name 904, the length of the artist name 908, and the length of the album name 912 may each be 64 bytes. Through use of the metadata data structure within the header portion, metadata for associated content files, such as audio or video files, can be conveniently stored in a manner for fast access and subsequent display during playback of the content file. This method provides for efficient storage and retrieval of the metadata for encrypted content files that have been stored in a memory, such as a non-volatile memory device.

Figure 10:
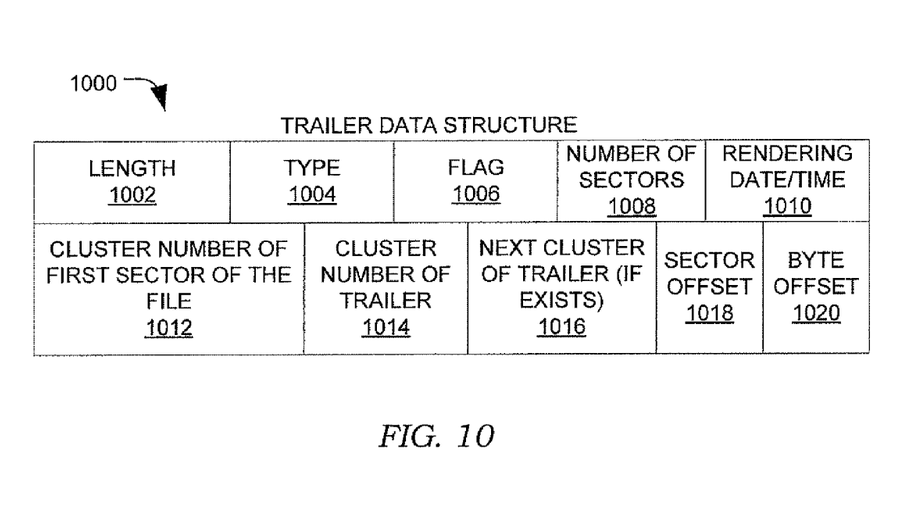
FIG. 10 is a general diagram that illustrates a data structure of a trailer that may be stored within a header portion of a file.

Referring to FIG. 10, a data structure for trailer data 1000 that may be stored within a header portion of a file is shown. The trailer data structure 1000 includes a length field 1002, a type field 1004, a flag 1006, a number of sectors field 1009, a recording date/time field 1010, a cluster number of a first sector of the file field 1012, a cluster number of the trailer field 1014, a next cluster of the trailer (if exists) field 1016, a sector offset field 1018, and a byte offset field 1020. In a particular illustrative embodiment, the length of the box for trailer information is 4 bytes and the box type field 1004 is filled with the indicator "ldat" to designate trailer data. The flag field 1006 may include a first bit that indicates whether the trailer is aligned with a sector boundary and a second bit that indicates whether the trailer contains more than one sector, up to the maximum number of sectors in a cluster. The recording date/time field 1010 is used to check if the file has been moved or is a copy of a file with a trailer box. The traditional file seek operation will be performed if the user has done a move or copy on a personal computer. The next cluster field 1016 is used to identify a next cluster if the trailer data is spread across two different clusters. The two clusters may not be contiguous.

The trailer data structure provides information, including specific cluster, sector, and byte location information of the trailer data for the file. By storing trailer data location information in a header portion of the file, a host device can quickly and efficiently access the trailer data from the header, instead of requiring a file system to go through a large and lengthy search of many encrypted files to retrieve particular trailer data. Thus, the method and system disclosed provide faster and more efficient access to retrieve trailer data for encrypted content files.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of storing content, the method comprising:
   in a data storage device with a non-volatile memory, the non-volatile memory including a storage element, wherein the data storage device is configured to be operably coupled to a host device that includes a memory area, performing:
   reading media content including a trailer, the trailer including trailer data related to the media content;
   extracting trailer location information related to the trailer data for storage with secure data in a header portion of a file, wherein the secure data includes at least one encryption key ID associated with an encryption key to encrypt the media content; and
   storing the file to at least one of the storage element of the non-volatile memory and the memory area of the host device coupled to the data storage device.

2. The method of claim 1, wherein the header portion includes metadata including ID3 data.

3. The method of claim 1, wherein an application programming interface (API) is used in connection with storing the trailer data with the secure data in the header portion of the file.

4. The method of claim 1, wherein the trailer location information comprises a cluster number and a sector offset.

5. The method of claim 1, wherein the at least one encryption key ID is provided by the host device.

6. The method of claim 1, further comprising receiving the media content from an external system via a data download process.

7. The method of claim 1, wherein the media content is stored in the data storage device prior to distribution of the data storage device to a consumer.

8. A method of retrieving content, the method comprising:
   from a data storage device with a non-volatile memory, wherein the data storage device is configured to be operably coupled to a host device, performing:
   reading the content from the non-volatile memory;
   reading trailer location information associated with the content from a portion of a file, the portion further including secure data items related to the content, wherein the secure data items include at least one encryption key ID associated with a decryption key to decrypt the content; and
   providing the trailer location information to a display device of a host device having access to the non-volatile memory.

9. The method of claim 8, wherein the host device has access to read the content for playback.

10. The method of claim 8, wherein the content includes audio data and video data.

11. The method of claim 8, wherein an application programming interface (API) is used in connection with reading the trailer data information from the file and wherein the host device passes a file name and a metadata structure to a file system toolkit, and wherein the file system toolkit uses the API to write the metadata to the file.

12. A method of accessing media content, the method comprising:
   in a data storage device with a non-volatile rewritable memory, the non-volatile rewritable memory including a storage element, wherein the data storage device is configured to be operably coupled to a host device, performing:
   reading a content file including encrypted media content from the non-volatile rewritable memory, the content file including trailer location information stored with secure data in a header portion of the content file;
   receiving information regarding access rights to the encrypted media content;

storing the access rights in a secure memory area of the non-volatile rewritable memory, the secure memory area including encryption key IDs associated with content decryption keys, the access rights permitting access to the content decryption keys for decrypting the encrypted media content stored in the non-volatile rewritable memory; and supplying a decrypted version of at least one selected encrypted media content item.

13. The method of claim 12, further comprising receiving authentication information, and decrypting the at least one selected encrypted media content item using the content decryption keys after receiving the authentication information.

14. The method of claim 12, wherein the host device includes a playback device for rendering the decrypted version of the at least one selected encrypted media content item, the method further comprising:

connecting the host device to a server;

sending a purchase authorization from the host device to the server;

receiving information regarding the authentication information and the access rights at the host device; and supplying the authentication information and the access rights to the non-volatile rewriteable memory.

15. The method of claim 12, wherein the host device is one of a phone device, a personal digital assistant (PDA), and a computer.

16. The method of claim 12, wherein the metadata includes an artist name, a length of the artist name, a content name, a length of the content name, an album name, a length of the album name, or any combination thereof.

17. The method of claim 12, further comprising altering the access rights to provide access to the content decryption keys in response to receiving authentication information so as to permit access to selected encrypted media content items stored in the non-volatile rewritable memory.

18. The method of claim 17, further comprising connecting the host device to a service provider; sending a purchase authorization from the host device to the service provider; and receiving the authentication information and information for altering the access rights from the service provider.

19. The method of claim 12, further comprising displaying information related to the metadata.

20. The method of claim 12, further comprising rendering the decrypted version of the at least one selected encrypted media content item while concurrently displaying information related to the metadata.

21. A method of storing content, the method comprising:
in a data storage device with a non-volatile memory, the non-volatile memory including a storage element, wherein the data storage device is configured to be operably coupled to a host device having a memory area, performing:

reading a content file including media content and including a trailer related to the media content, wherein the trailer is defined by trailer location information identifying a portion of the media content;

storing the content file together with secure data in a file, wherein the secure data includes at least one encryption key ID associated with an encryption key to encrypt the media content from the content file; and storing the content file to at least one of the storage element of the non-volatile memory and the memory area of the host device coupled to the non-volatile memory device.

* * * * *